United States Patent [19]

Matrick

[11] Patent Number: 4,561,899
[45] Date of Patent: Dec. 31, 1985

[54] PIGMENT TONERS WITH IMPROVED TRANSPARENCY

[75] Inventor: Howard Matrick, Highlands, N.J.

[73] Assignee: E. I. Du Pont de Nemours and Company, Wilmington, Del.

[21] Appl. No.: 673,925

[22] Filed: Nov. 21, 1984

[51] Int. Cl.$^4$ .............................................. C08L 1/08
[52] U.S. Cl. ................................ 106/193 P; 106/196; 106/308 Q; 106/308 N; 106/308 C; 428/204
[58] Field of Search ........... 106/308 Q, 308 N, 193 P, 106/196, 308 C; 428/204

[56] References Cited

U.S. PATENT DOCUMENTS

| | | | |
|---|---|---|---|
| 3,778,282 | 12/1973 | Manier | 106/190 |
| 4,083,686 | 4/1978 | Dimroth et al. | 8/696 |
| 4,270,917 | 6/1981 | Heald et al. | 8/584 |

FOREIGN PATENT DOCUMENTS 2039935  8/1980  United Kingdom .

Primary Examiner—A. Lionel Clingman
Assistant Examiner—Amelia B. Yarbrough

[57] ABSTRACT

Yellow crystal stable pigment of mono-azo type having an average particle size of 0.02 to 0.8 μm, the pigment having on its surface a crystal growth inhibitor compound having substantially similar chemical structure as the pigment, being more soluble than the pigment in solvents used to disperse the pigment, the inhibitor compound not fitting within the crystal lattice of the pigment. The crystal growth of pigment dispersions due to Ostwald ripening can be prevented by adding a crystal growth inhibitor as noted above to the pigment dispersion. The pigments can be dispersed in an organic polymeric binder, e.g., cellulose acetate, to form yellow toners which are useful in toning photosensitive color proofing systems.

6 Claims, No Drawings

PIGMENT TONERS WITH IMPROVED TRANSPARENCY

DESCRIPTION

1. Technical Field

This invention relates to a pigment stable to crystal growth of the yellow mono-azo class. More particularly this invention relates to a toner wherein the stable pigment is dispersed in an organic polymeric binder. This invention also relates to a process for preventing crystal growth of a pigment dispersion due to Ostwald ripening of the pigment in the presence of a solvent.

2. Background Art

Reproduction processes are known wherein positive-working photopolymerizable elements and negative-working photosensitive elements are exposed imagewise through an original forming nontacky and tacky image areas. Positive-working photopolymerizable elements are described in Chu and Cohen U.S. Pat. No. 3,649,268, and negative-working photosensitive elements are described in Cohen and Fan U.S. Pat. Nos. 4,174,216 and 4,247,619. The image is developed by toning with a suitable toner which desirably adheres only in the tacky areas. Excess toner which may be present is removed from the nontacky image areas to provide, for example, an image which is a proof of the original. Multilayer proofs, such as surprint proofs, can be made.

The commercial success of multicolor proofs depends on the final proof accurately simulating the print from which the proof is prepared. Some yellow toners possess relatively high opacity and therefore must be used first in the color sequence of preparing accurate multicolor proofs. Many commercial proofers prefer to make proofs with the same color sequence used on press putting yellow in the second or third position in the color sequence. This places severe limitations on the ability to accurately simulate press printing since printing inks are generally transparent. In addition, small variations in yellow toner opacity from batch to batch cause relatively greater color differences in final proofs.

To overcome the above disadvantages, it is desirable to provide yellow pigments which are crystal stable (e.g., stable to crystal growth during dispersion in a solvent) and which are transparent when used to tone proofs regardless of toning sequence.

DISCLOSURE OF THE INVENTION

In accordance with this invention there is provided a crystal stable yellow mono-azo pigment having an average particle size of 0.02 to 0.8 μm, said pigment having on its surface a crystal growth inhibitor compound having a substantially similar chemical structure as said pigment, being more soluble than the pigment in solvents used to disperse the pigment, the inhibitor compound not fitting within the crystal lattice of the pigment.

In accordance with an embodiment of this invention there is provided a toner which comprises a pigment as defined above dispersed in an organic polymeric binder.

In accordance with another embodiment of this invention there is provided a process for preventing the crystal growth of a pigment dispersion due to Ostwald ripening of the pigment in the presence of a solvent therefor, the process consisting essentially of dispersing the pigment in the solvent therefor in the presence of a crystal growth inhibitor compound having a chemical structure substantially similar to that of the pigment, being more soluble than the pigment in solvents used to disperse the pigment, the inhibitor compound not fitting within the crystal lattice of the pigment.

The stable pigments of this invention are yellow pigments of the mono-azo type. The average particle size of the pigments is in the range of 0.02 to 0.8 μm, preferably 0.05 to 0.3 μm. The term "particle size" as used herein with respect to the pigments covers the size distribution of the smallest, independently acting unit of colorant which is called upon to discriminate between the exposed and underexposed areas of the imaging layer. As such the particle may be (1) a single crystallite or crystals (as synthesized), (2) an aggregate or agglomerate of pigment crystallites, or (3) a matrix particle containing evenly dispersed pigment crystallites. The particle size distribution can be measured, for example, by surface area measurements, preferably by an electron transmission microscope. An example of a mono-azo pigment is of the formula:

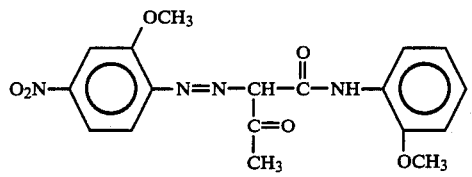

This is known, as Dalamar ® Yellow, C.I. Pigment Yellow 74, Heubach, Inc., Newark, NJ. Another example is:

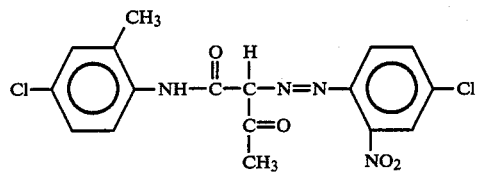

This pigment is Hansa ®10GX, American Hoechst Co., Somerville, NJ. The invention is not limited to these specific pigments as other pigments of these types are known to those skilled in the art. The pigments are opaque due primarily to their large crystallite size and additional crystal growth which occurs when the pigments are used to make toners. Dalamar ® Yellow pigment, in particular, undergoes crystal growth because it is relatively soluble in milling solvent, e.g., acetone (55%)/water(45%).

Surprisingly, it has been found that when a pigment of the above type has on its surface a compound having a substantially similar chemical structure as the pigment, the compound being more soluble than the pigment in solvents used to disperse the pigment and not fitting within the crystal lattice of the pigment, the crystal growth of the pigment is inhibited. The compound present on the surface of the pigment is designated herein as a "crystal growth inhibitor." Using the above requirements for the crystal growth inhibitor suitable such compounds can be prepared for the particular pigment. By way of illustration a crystal growth inhibitor useful with Dalamar ® Yellow pigment is of the formula:

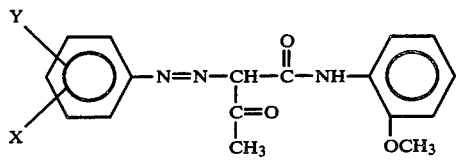

wherein
when X is H or ortho substituted alkyl of 1 to 4 carbon atoms, Y is para substituted alkali metal sulfonate; or when X is H or para substituted alkyl of 1 to 4 carbon atoms, Y is ortho substituted alkali metal sulfonate; or

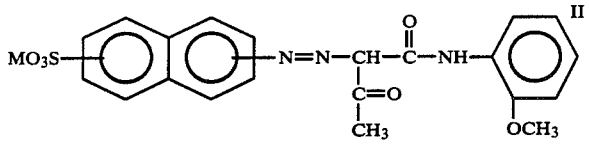

wherein M is a monovalent cation.

A crystal growth inhibitor useful with Hansa ® 6GX type pigments is:

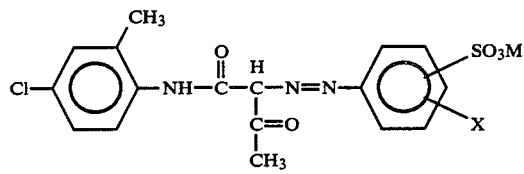

wherein X is alkyl of 1 to 4 carbon atoms and M is a monovalent cation.

The particular pigment and related crystal growth inhibitor are mixed together generally on a roller mill although other mixing, or dispersing means known to those skilled in the art can be used. The mixing occurs in the presence of a milling solvent, e.g., acetone (55%) water (45%), etc. Stainless steel balls, e.g., 0.125 inch (3.175 mm) in diameter aid in the mixing. The process consists essentially of dispersing the pigment in a solvent or solvent mixture therefor and thereafter adding the crystal growth inhibitor.

Due to the small crystallite size the pigments may cause stain to some noticeable degree. Aggregates of the pigments may be more advantageous. Aggregation is sometimes achieved by addition of certain wetting agents used in making water dispersible pigments. Aggregation may also be achieved by treating the pigment with the crystal growth inhibitor on its surface with gelatin-like or monomeric substances to bind them by adhesion to other crystallites. Pigments which in their crystallite form cause staining have been made relatively nonstaining by such treatment. It is usually necessary to dry grind aggregates in order to achieve proper balance of nonstaining properties and density.

Preferably when the pigment and related crystal growth inhibitor are mixed together a resin matrix is present whereby the pigment crystallites are finely dispersed in the resin matrix. The dry resin particles are then ground to proper effective particle size. This method provides small pigment crystallites required for high color density in the form of a nonstaining colorant particle of proper effective particle size. Resin matrices include: cellulose acetate, polymethylmethacrylate, polystyrene, etc.

After the toners have been prepared as described above or by other means known to those skilled in the art, the toners are useful for preparing color proofs using either positive-working photopolymerizable elements or negative working photosensitive elements. Positive-working photopolymerizable elements and their process of use are described in Chu and Cohen U.S. Pat. No. 3,649,268, which is incorporated herein by reference. Negative-working photosensitive elements are described in Cohen and Fan U.S. Pat. No. 4,247,619 and the process of use is described in Cohen and Fan U.S. Pat. No. 4,174,216, the disclosures of which are incorporated herein by reference. In the preparation of proofs of the surprint type the yellow toners do not have to be used to tone the first tacky layer but can be used for toning the second or third layers of the proof without substantial change in toning quality. This result is achieved since the toners have been shown to exhibit higher transparency as determined by standard denstiometers. A preferred embodiment of the invention is described in Example 1 using Compound A.

INDUSTRIAL APPLICABILITY

The crystal stable yellow pigmens of the invention are dispersed with an organic polymeric binder, e.g., cellulose acetate, etc., dried and ground into a fine yellow powder toner. The toners are useful in the preparation of the yellow layer of a multilayer color proof using either positive-working photopolymerizable element or negative working photosensitive elements. The proofs can be of the overlay or surprint type. The positive-working proofs are described in Chu and Cohen U.S. Pat. No. 3,649,268 and the negative-working proofs are described in Cohen and Fan U.S. Pat. No. 4,174,216. The yellow pigments and toners of the invention exhibit increased transparency.

EXAMPLES

This invention is illustrated but not limited by the following examples wherein the parts and percentages are by weight.

PROCEDURES

Preparation of Crystal Growth Inhibitor Compounds

Compound A

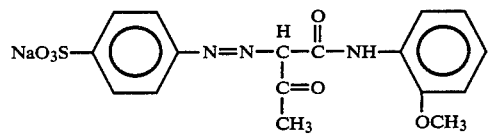

Diazonium Salt Preparation

The following ingredients were placed in a suitable vessel:

| | |
|---|---|
| Distilled Water | 800.0 ml |
| NaOH (50%) | 50.8 g |
| Sulfanilic Acid | 96.6 g |

The temperature was adjusted to 24°–27° C. with stirring and the pH adjusted to 10.5–11.5 with dilute NaOH or HCl. After all ingredients were completely dissolved, 4.0 g of activated charcoal was added and the slurry obtained was stirred for 20 minutes. The charcoal was then filtered off and the solution cooled to 0° to −2° C. and then diluted with ice to 1450 ml. A solution of 39.6 g sodium nitrite in 80 ml of water was then added followed by 126 g HCl (conc.) in 80 ml water added over 45 minutes keeping the solution of 0° to −2° C. After 5 minutes stirring, this slurry was positive to both Congo Red paper and KI-Starch paper. The slurry was kept at 0° to −2° C.

Arylide Preparation

The following ingredients were placed in a suitable vessel:

| | |
|---|---|
| Distilled Water | 3180.0 ml |
| NaOH (50%) | 46.4 g |
| Acetoacet-o-anisidide | 121.6 g |
| (Aldrich Chemical Co., Milwaukee, Wisconsin) | |

After the ingredients were mixed and dissolved, the pH was adjusted to 10.8–11.0 by adding 61.6 g of sodium carbonate. The volume was then adjusted to 3750 ml with water and the temperature adjusted to ca. 24°–27° C.

Coupling

The diazonium salt slurry was then added to the arylide solution being stirred using a subsurface addition tube. The mixture was allowed to stand for ca. 16 hours and the pH adjusted to 6.5–7.0 with acetic acid (glacial), cooled to about 10° C. and the product filtered therefrom. The filtered product was washed successively with a chilled solution of 140 g NaCl in 400 ml of water and a 400 ml of chilled water. The dried compound weighed 288 g. The compound had a greenish-yellow color.

Compound B

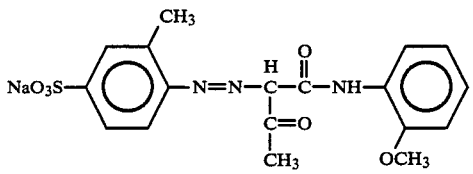

The same procedures were followed as those described for Compound A except that the sulfanilic acid was replaced by an equimolar quality of 2-aminotoluene-5-sulfonic acid. The compound obtained was reddish yellow.

Compound C

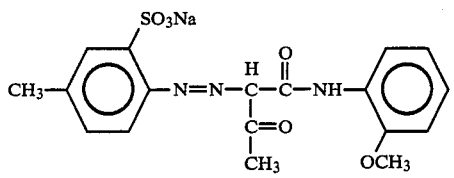

The same procedures were followed as those described for Compound A except that the sulfanilic acid was replaced by an equimolar quantity of 2-amino-5-methyl-benzenesulfonic acid. The compound obtained was a bright greenish yellow solid and weighed 300 g.

Compound D

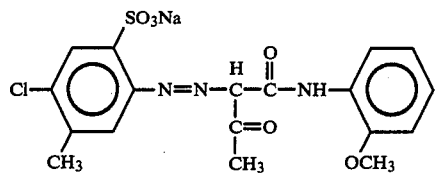

The same procedures were followed as those described for Compound A except that the sulfanilic acid was replaced by 2-amino-5-chloro-p-toluene sulfonic acid and 1 drop of a nonionic surfactant (Igepal® C0630 GAF Corp., NY, NY) was added to the NaOH solution prior to amine addition to facilitate the wetting. A yellow colored compound was obtained.

Compound E

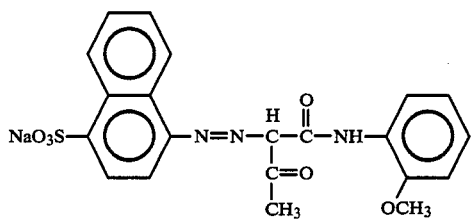

Diazonium Salt Preparation

The following ingredients were placed in a suitable vessel:

| | |
|---|---|
| Distilled Water | 800.0 ml |
| NaOH (50%) | 50.8 g |
| Napthionic Acid, | 124.8 g |
| (Aldrich Chemical Co.) | |

This slurry was stirred at ca. 25° C. and the pH adjusted to 10.4 with NaOH or HCl. After all the solids had dissolved, the solution was treated with 40 g of activated charcoal and filtered. The solution was then cooled to 0° to −2° C. and diluted to 1500 ml with ice. A solution of 126 g HCl (conc.) in 80 ml of water was then added over a 20 minute period. A solution of 39.6 g sodium nitrite in 80 ml water was then added through a subsurface tube over a 40 minute period.

Arylide preparation and coupling were carried out in the same manner as described for Compound A.

Compound F

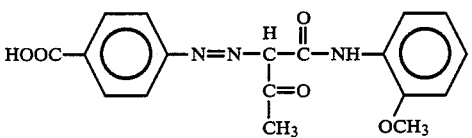

Diazonium Salt Preparation

The following ingredients were placed in a suitable vessel:

| Ingredient | |
|---|---|
| Distilled Water | 800.0 ml |
| NaOH (50%) | 50.8 g |
| p-Aminobenzoic Acid | 38.3 g |

This slurry was stirred at 25° C. and the pH adjusted to 10.4. After all solids had dissolved, the solution was cooled to 0° to −2° C. and 126 g HCl (conc.) in 40 ml water added over a 15 minute period. Then, a solution of 39.6 g sodium nitrite in 80 ml water was added through a subsurface tube over a period of ca. 20 minutes. This soution was then stirred 15 minutes at 0° to −2° C. with 40 g of activated charcoal and filtered.

Arylide solution preparation and the coupling reaction were the same procedures as those used for the preparation of Compound A except that the final pH was adjusted to 2–3 with HCl (conc.) prior to collecting the product. Additionally, the filtered product was not washed with NaCl solution but with water until said water was free of acid as tested by litmus paper. The yellow compound prepared weight 162 g.

EXAMPLE 1

The following ingredients were added to each of four, 16 ounce (0.47 liter) jars:

| Ingredient | Sample I | Sample II | Sample III | Sample IV |
|---|---|---|---|---|
| Stainless Steel Ball Bearings, 0.125 inch (3.175 mm) | 878.0 g | 878.0 g | 878.0 g | 878.0 g |
| Cellulose Acetate Eastman Kodak Co. #CA394-45 | 17.0 g | 17.0 g | 17.0 g | 17.0 g |
| Yellow Pigment (Hoechst Hansa ®Yellow 5GX-02, American Hoechst Co., Somerville, NJ) | 11.3 g | 11.30 g | 11.3 g | 11.3 g |
| Acetone(55%)/ Water(45%) | 150.0 ml | 150.0 ml | 150.0 ml | 150.0 ml |
| Compound A | 0-Control | 0.28 g | 0.55 g | 1.10 g |

The jars were sealed and tumbled on a roller mill at 80 rpm for about 66 hours. Then, 50 ml more of the acetone/water mixture was added and the jar contents were refiltered. The combined filtrates were diluted with 350 ml of water over a 15 minute period with agitation. After stirring 10 minutes, the resulting solids were collected by filtration, washed with 2 liters of water, dried overnight at 100°–110° C. and then ground to a fine powder.

In order to test the effacacy of these toners a photopolymerized element of the type described in Chu et al., U.S. Pat. No. 3,649,268 was laminated at ca. 105° C. to Kromekote ® white coated paper with a polyethylene protective cover sheet laminated over the photopolymer layer. These photopolymer elements comprise photohardenable materials in which the stick temperature is raised by exposure to light. Thus, the unexposed portion remain tacky and powders and toners can be adhered thereto. By successively repeating the laminating cover sheet peel-off and toning step using different color toners, a four color proof is prepared. In this particular example, the cover sheet was removed and the tacky photopolymer exposed was toned with a black toner. Another layer of photopolymer was laminated thereon and the cover sheet removed. A sample of this element was used with each of the four yellow toners described above. The change in black density was then measured on a MacBeth Densitometer as follows:

| Toner Used | ΔD |
|---|---|
| I-Control | 0.40 |
| II | 0.21 |
| III | 0.22 |
| IV | 0.22 |

From the results obtained, the toners of this invention, containing a crystal growth inhibitor, are more transparent than the control.

EXAMPLES 2 TO 7

Yellow toners were made as described in Example 1 (Sample III) using Compounds B to F in a toner made with Hansa ® Brilliant Yellow 5GX-02, American Hoechst Co., Somerville, NJ. In all cases, the transparency of the toner was increased over a control wherein the growth inhibitor compound of substantially similar chemical structure was not present.

I claim:

1. A crystal stable yellow mono-azo pigment having an average particle size of 0.02 to 0.8 μm, said pigment having on its surface a crystal growth inhibitor compound having a substantially similar chemical structure as said pigment, being more soluble than the pigment in solvents used to disperse the pigment, the inhibitor compound not fitting within the crystal lattice of the pigment.

2. A stable pigment according to claim 1 wherein the pigment is a mono-azo pigment of the formula:

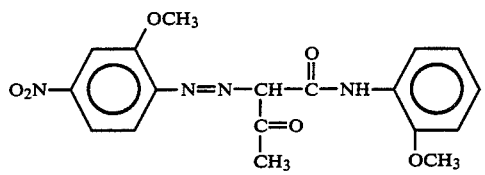

and the crystal growth inhibitor is of the formula:

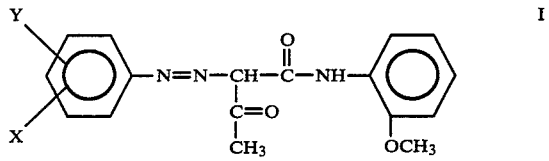

wherein
when X is H or ortho substituted alkyl of 1 to 4 carbon atoms, Y is para substituted alkali metal sulfonate; or when X is H or para substituted alkyl of 1 to 4 carbon atoms, Y is ortho substituted alkali metal sulfonate; or

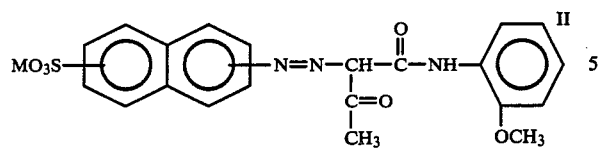

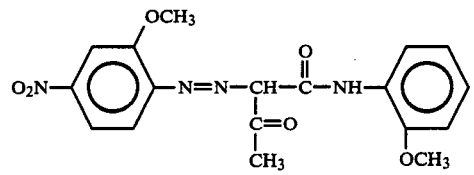

wherein M is a monovalent cation.

3. A toner which comprises a pigment according to claim 1 dispersed in an organic polymeric binder.

4. A toner according to claim 3 wherein the organic polymeric binder is cellulose acetate.

5. A process for preventing the crystal growth of a pigment dispersion due to Ostwald ripening of the pigment in the presence of a solvent therefor, the process consisting essentially of dispersing the pigment in the solvent therefor in the presence of a crystal growth inhibitor compound having a chemical structure substantially similar to that of the pigment, being more soluble than the pigment in solvents used to disperse the pigment, the inhibitor compound not fitting within the crystal lattice of the pigment.

6. A process according to claim 5 wherein the pigment is a mono-azo pigment of the formula:

and the crystal growth inhibitor is of the formula:

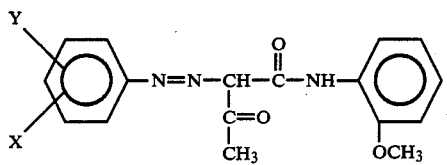

wherein
when X is H or ortho substituted alkyl of 1 to 4 carbon atoms, Y is para substituted alkali metal sulfonate; or when X is H or para substituted alkyl of 1 to 4 carbon atoms, Y is ortho substituted alkali metal sulfonate; or

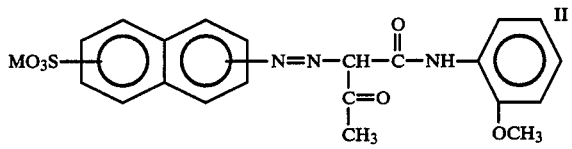

wherein M is a monovalent cation.

* * * * *